United States Patent [19]

Park

[11] Patent Number: 4,694,025
[45] Date of Patent: Sep. 15, 1987

[54] ALCOHOL CONTROL OF LIGHTLY CROSSLINKED FOAMED POLYMER PRODUCTION

[75] Inventor: Chung P. Park, Pickerington, Ohio

[73] Assignee: The Dow Chemical Company, Midland, Mich.

[21] Appl. No.: 672,010

[22] Filed: Nov. 16, 1984

[51] Int. Cl.$^4$ .................................................. C08J 9/14
[52] U.S. Cl. .................................... 521/88; 521/89; 521/93; 521/134; 521/136; 521/139; 521/143; 521/146; 521/154
[58] Field of Search .................. 521/139, 143, 146, 98, 521/154, 88, 93, 136, 89

[56] References Cited

U.S. PATENT DOCUMENTS

| | | | |
|---|---|---|---|
| 3,102,865 | 9/1963 | Sneary et al. | 521/79 |
| 3,452,123 | 6/1969 | Beckmann et al. | 521/79 |
| 4,160,072 | 7/1979 | Shinkai et al. | 521/95 |
| 4,252,906 | 2/1981 | Hosokawa et al. | 521/93 |
| 4,333,898 | 6/1982 | Schmidtchen | 521/79 |
| 4,351,910 | 9/1982 | Sugitani et al. | 521/59 |
| 4,413,066 | 11/1983 | Isaka et al. | 525/326.5 |
| 4,421,867 | 12/1983 | Nojiri et al. | 521/88 |
| 4,446,254 | 5/1984 | Nakae et al. | 521/79 |
| 4,454,086 | 6/1984 | Corbett et al. | 521/147 |
| 4,456,704 | 6/1984 | Fukumura et al. | 521/79 |

FOREIGN PATENT DOCUMENTS 1408154 10/1975 United Kingdom .

Primary Examiner—Morton Foelak

[57] ABSTRACT

An expandable ethylenic or styrenic polymer composition for production of lightly crosslinked foamed polymers and a process for controlling the degree of crosslinking of the polymer prior to extrusion foaming. The control is obtained by use of (a) a reversible gas-yielding crosslinking reaction which is delayed in the foam extrusion line in the presence of gaseous products (alcohols) and (b) added amounts of an alcohol such as an aliphatic alcohol. Suitable crosslinking agents include silanes, azido functional silanes, titanates, and amino compounds.

13 Claims, No Drawings

ALCOHOL CONTROL OF LIGHTLY CROSSLINKED FOAMED POLYMER PRODUCTION

BACKGROUND OF THE INVENTION

This invention relates to an expandable polymer composition and a process for preparing lightly crosslinked, extruded, closed-cell foamed polymer articles from that composition. It particularly pertains to expandable ethylenic or styrenic polymer compositions containing a reversible crosslinking system which permits alcohol control of the degree of crosslinking of the polymer prior to extrusion foaming.

It is well known to make closed-cell polymer resin foams by the process of extrusion foaming wherein a normally solid thermoplastic polymer resin is heat-plastified and mixed under pressure with a volatile material to form a flowable gel which is then passed through a shaping orifice or die opening into a zone of lower pressure. Upon the release of pressure, the volatile constituent of the gel vaporizes, forming a gas phase cellular structure in the gel which cools to a corresponding cellular foamed solid resin. Desirably, the resulting gas cells are substantially uniform in size, uniformly distributed through the foam body, and closed, i.e., separated from each other by membrane walls of resin.

It is also known that the use of relatively lightly to moderately crosslinked polymers generally improves the quality of foamed polymers articles.

In addition, lightly crosslinking in some instances make possible foaming of polymer foams which otherwise cannot easily be produced. Some polymers such as linear polyethylenes are difficult to foam by extrusion. It is generally believed that poor melt strength together with a sharp change in melt viscosity near the transition temperature makes extrusion foaming of linear polyolefins difficult. Since light crosslinking increases polymer viscosity and thus broadens the range of foaming temperature, crosslinking would also be desirable from this standpoint.

However, a crosslinked polymer is difficult to extrude. As such, past practices have ordinarily not involved crosslinking during normal thermoplastic fabrication processing procedures such as production of extruded foamed polymer articles. As a result, most research works have been directed to production of a crosslinked polymer composition expandable during post-extrusion secondary foaming. Recently, however, advances have been made in overcoming some of the problems involved.

For example, Corbett U.S. Pat. No. 4,454,086 (assigned to the assignee of the present invention) discloses making crosslinked styrene polymer foams by an extrusion process. In Corbett a styrene/acrylic acid copolymer is lightly crosslinked in the foam extrusion line with a multi-functional epoxy resin. Since covalent bonds formed by the acid/epoxy reactions are not reversible, the scheme calls for a close control of epoxy level or the reaction rate.

In addition, silane and peroxide crosslinkers have been used to crosslink polyolefin and polystyrene foams which may be produced by using an extrusion foaming machine. U.S. Pat. Nos. 4,446,254; 4,421,867; 4,351,910, and 4,252,906, amongst others, fall into this category. Sugitani U.S. Pat. No. 4,351,910, for example, proposes improving the heat resistance of a polystyrene foam by introducing an organosilane compound into a styrene series resin. The silane structure is chemically bonded to the molecular structure of tne styrene series resin by addition polymerization, by graft polymerization or by free radicals. The degree of crosslinking is disclosed as being temperature dependent. As such, Sugitani states that crosslinking can be delayed by low temperature processing since it only proceeds gradually at temperatures below 100° C.

It is also known that crosslinking can be delayed by swelling the polymer so as to permit working in crosslinking agents at temperatures below the starting point of the used crosslinking agents. Thus, Beckmann et al. U.S. Pat. No. 3,452,123 discloses adding an organic solvent to swell an ethylene polymer and then admixing therein, at a temperature below the starting point of the used crosslinking agent, the propellant and the crosslinking agent. Extrusion of the resulting mass is carried out at temperatures above the softening point of the swelled compound. This system is said to result in delay of the crosslinking so that it, preferably, occurs in the extrusion die.

Still, the delayed crosslinking system of Slogburg, like the crosslinking and foaming systems of the others mentioned, is not reversible and therefore requires rather careful temperature and processing controls. The need exists therefore for improved means for controlling the degree of crosslinking of an expandable polymer prior to extrusion foaming.

SUMMARY OF THE INVENTION

The present invention meets that need by use of a reversible gas-yielding crosslinking reaction which is delayed in the foam extrusion line in the presence of gaseous products (alcohols) but proceeds further during foam expansion at the die. Thus, the crosslinking control of the present invention is primarily accomplished by inclusion of an aliphatic alcohol, along with the blowing agent, in the polymer admixture.

Since a delayed crosslinking system makes control of crosslinking easier, this permits, for example, a high level of crosslinking with the extrusion foaming process. Increased heat distortion temperatures are the benefits of such a highly crosslinked polymer.

Another advantage of the presence of alcohol in the blowing agent is that it can accelerate steam expansion by lowering the glass transition temperature of the polymer and also by promoting water vapor transmission. Faster permeation of water could result from its enhanced solubility in the polymer/alcohol phase and its higher diffusivity in the alcohol-plasticized polymer. On-line steam expansion, in turn, drops foam density enabling production of highly expanded polymer foams.

Basically, the foam extrusion process relies on physical equilibrium between a polymer and blowing agent. A physical blowing agent is mixed in and equilibriated with the polymer in the foam extrusion line. The blowing agent remains dissolved and contained in the polymer phase. Upon exposure to atmospheric pressure at the exit of the die, the gel undergoes phase separation. The blowing agent separates from the polymer phase and rapidly diffuses into the microcavities expanding the polymer to a cellular structure.

A gas-yielding reversible reaction can reach a chemical equilibrium in the foam extrusion line much the same way as the physical equilibrium between polymer and blowing agent. The crosslinking reaction of the present invention is, thus, one which reversibly produces a gaseous alcohol reaction product. In the foam extrusion line, the gaseous product remains dissolved in the polymer, limiting formation of cross-bonds to an equilibrium level. At the die during foam expansion, the volatile product rapidly diffuses into the cell cavities depleting its concentration in the polymer phase and letting the reaction proceed further. The in situ formed additional cross-bonds help set the expanding bubbles.

For successful implementation of this mechanism:

(1) the crosslinking reaction must be reversible yielding a gaseous product and (2) the gaseous product must possess the properties required for a good secondary blowing agent; (a) adequate solubility in the polymer in the line, (b) high diffusivity during foam expansion, (c) low solubility at ambient temperature, and (d) low toxicity and flammability.

It has been found that various crosslinking reaction systems which reversibly yield an alcohol may be used since many alcohols possess the required secondary blowing agent characteristics. Crosslinking agents which do so with ethylenic and styrenic polymers include silanes, azido silanes, titanates and amino compounds.

Generally, any grafted silane having more than one hydrolyzable group is useful as the crosslinking agent. The silane may be an organofunctional silane of the general formula R R' Si $Y_2$ in which R represents a vinyl, epoxy or amine functional radical attached to silicon through a silicon carbon bond and composed of carbon, hydrogen and optionally oxygen or nitrogen, each Y represents a hydrolyzable organic radical and R' represents a hydrocarbon radical or Y. Examples of such organofunctional silanes are found in U.S. Pat. No. 3,646,155, which is specifically incorporated herein by reference. Alternatively, the silane may be an alkoxy silane of the general formula $R_a Si(OR')_b$, where "a" is 1,2 and "b" is 2,3, R is methyl or organoreactive alkyl group and OR' is a hydrolyzable alkoxy group, or it may be a hydroxy functional silicone intermediate. Examples of such alkoxy silanes are found in U.S. Pat. No. 4,351,910, which is specifically incorporated herein by reference.

The silane crosslinking agent is preferably one which is both organofunctional and alkoxy. Examples of organofunctional alkoxy silanes which may be used are gamma-glycidoxypropyltrimethoxy silane, gamma-methacryloxypropyltrimethoxy silane, vinyltrimethoxy silane, vinyltriethoxy silane, N-(2-aminoethyl)-3-aminopropyltrimethoxy silane, N-$\beta$-(N-vinyl benzyl amino) ethylaminopropyltrimethoxy silane, methyltrimethoxy silane, and gamma -aminopropyl triethoxy silane.

While all of the crosslinking agents utilized in the present invention are useful for producing lightly crosslinked polymer foams, the most preferred crosslinking agents are the azido functional silanes of the general formula R R'SiY$_2$, in which R represents an azido functional radical attached to silicon through a silicon to carbon bond and composed of carbon, hydrogen, optionally sulfur, nitrogen, and oxygen, each Y represents a hydrolyzable organic radical, and R' represents a monovalent hydrocarbon radical or a hydrolyzable organic radical. Examples of the azido functional silanes which may be used are found in U.S. Pat. Nos. 3,705,911 and 4,401,598, which are specifically incorporated herein by reference. Preferred amongst the azido functional silanes are 2-(trimethoxysilyl) ethyl phenyl sulfonyl azide and (triethoxy silyl) hexyl sulfonyl azide.

The titanate crosslinking agent may be a titanium alkoxide of the general formula Ti(OR)$_4$ where R is C$_1$ to C$_{18}$ alkyl or it may be a titanate coupling agent of the general formula (RO)$_m$—Ti(O—X—R$^2$—Y)$_n$ wherein R is typically alkyl, X is carboxyl, R$^2$ is a long carbon chain, Y is reactive double bond or amino, and m and n are integers which total 4. Preferred amongst the titanates are titanium isopropoxide, and tetramethyl titanate.

Preferred as amino crosslinking agents are hexamethoxymethylmelamine (HMMM) and alkylated glycolurilformaldehyde resins.

The ethylenic or styrenic polymer material may be an olefinic polymer or copolymer; an alpha-olefin polymer with an $\alpha,\beta$ ethylenically unsaturated carboxylic acid, hydroxyl ethyl acrylate or carbon monoxide; a styrene homopolymer or copolymer; styrene having hydroxyl, carboxylic acid and carbonyl functional groups; vinyl toluene polymers; or mixtures and blends thereof. For example, the ethylenic or styrenic material may be linear low density polyethylene, high density polyethylene, polypropylene, styrene/acrylic acid copolymers, ethylene/acrylic acid copolymers, styrene/acrylonitrile/hydroxy ethyl-acrylate terpolymers, and mixtures thereof.

The blowing agent may be selected from conventional physical blowing agents such a chlorofluorocarbons, chlorocarbons, hydrocarbons and alcohols. Preferred are dichlorodifluoromethane, trichloromonofluoromethane, dichlorotetrafluoroethane, and mixtures thereof.

When halogenated hydrocarbon compounds are used as the blowing agent, there can be from about 0.013 to about 0.50 gram mole, and preferably 0.040 to 0.30 gram mole of such blowing agent per 100 grams of polymer resin in the admixture.

The alcohol used to control the degree of crosslinking is preferably an aliphatic alcohol such as methanol (methyl alcohol), ethanol (ethyl alcohol), n-propanol (propyl alcohol), i-propanol (isopropyl alcohol) and butanols (butyl alcohols).

Preferably, the alcohol is added during processing along with the blowing agent. For example, an 80/20 mixture of dichlorodifluoromethane/methanol may be used as the blowing agent/alcohol. The weight ratio of blowing agent to alcohol may, however, vary from approximately 70/30 to 95/5.

In some instances, however, an alcohol can serve the dual purpose of crosslinking delaying and blowing agent when used with a crosslinking agent in accordance with the present invention. Alcohols are somewhat deficient in blowing power with their low vapor pressure and high solubilities in certain polymers. Lightly crosslinking permits raising the foaming temperature and thus the blowing efficiency leading to low foam densities. Thus, it is possible to use alcohol alone as the blowing agent/crosslinking control with certain crosslinking agents and polymers.

In any event, addition of an alcohol along with the blowing agent permits control of the degree of crosslinking when the crosslinking reaction mechanism is a reversible one yielding alcohols.

DESCRIPTION OF THE PREFERRED EMBODIMENTS

For example, the fundamental chemistry involved in silane crosslinking is depicted by the following reactions:

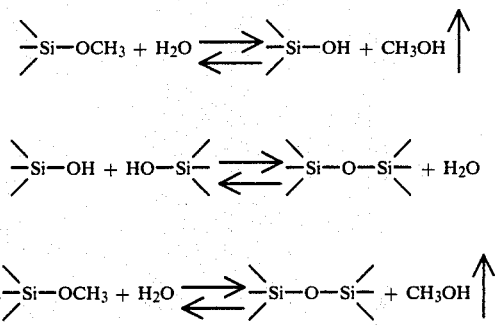

Methoxy silane hydrolyzes reversibly to silanol releasing methanol by reaction (a). Silanols condense to siloxane linkages releasing water by reaction (b). Overall two moles of methoxy silane and one mole of water reversibly produce one mole of siloxane crosslink releasing one mole of methanol by reaction (c).

Alkoxy functional silanes graft on ethylenic or styrenic polymers having carboxylic acid groups through reaction of carboxylic acids with methoxy groups forming acyloxy silane linkages, again with the release of alcohol.

Amino functional silanes graft on polymers having carboxylic acid or anhydride groups. Silanes having epoxy functional groups also react with carboxylic acid-functional polymers such as copolymers of acrylic acid with ethylene or styrene. Since reversible, alcohol yielding, reaction mechanisms occur with silanes of this type, these crosslinking mechanisms are controllable by use of an alcohol in the processing.

A titanium alkoxide reversibly reacts with a carboxylic acid or hydroxyl functional polymer releasing alcohols. Amino crosslinking agents can also be used to crosslink polymers containing hydroxyl, carboxy or amide functionality. Amino crosslinking agents crosslink such functionalized polymers through a condensation reaction releasing alcohol as a product. In addition, titanate and amino crosslinking agents are inexpensive permitting a high level of use without cost penalties.

However, as noted, the silane, titanate and amino crosslinking mechanisms require a polymer having a functional group such as carboxylic acids. An azido functional silane is unique in that it can graft on most polymers through the nitrine insertion reaction:

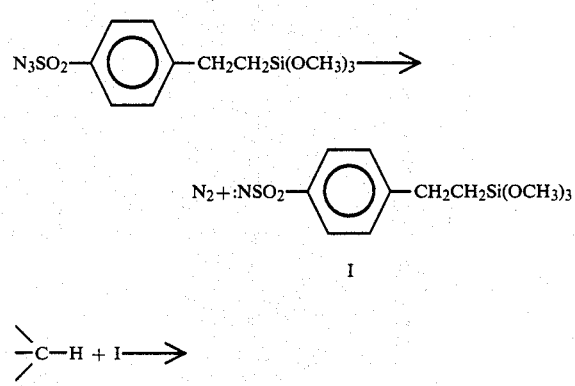

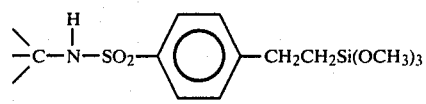

Therefore, an azido functional silane can graft on and crosslink polyethylene and polystyrene having no reactive functional group.

Accordingly, azido functional silanes are the preferred crosslinking agent and will be used as the illustrative crosslinking agent in the general description of the preferred embodiment which follows. Still, as long as the reaction between the polymer and the crosslinking agent is a reversible one yielding alcohols, it is controllable in accordance with the instant invention, and various of the following examples illustrate use of others of the crosslinking agents.

In accordance with the process of the present invention, lightly crosslinked polymer foams may be made on conventional melt processing apparatus such as by continuous extrusion from a screw-type extruder. Such an extruder typically comprises a series of sequential zones including a feed zone, compression and melt zone, metering zone, and mixing zone. The barrel of the extruder may be provided with conventional electric heaters for zoned temperature control.

An inlet, such as an injection nozzle, is provided for adding a mixture of fluid blowing agent and crosslinking agent under pressure to the polymer in the extruder barrel between the metering and mixing zones. Crosslinking agent is pumped, in a controllable manner, into the stream of fluid blowing agent upstream of the injection nozzle. The blowing agent and crosslinking agent are compounded into the starting polymer in a conventional manner to form a flowable gel or admixture, preferably in a continuous manner. Thus, the polymer, blowing agent, and crosslinking agent may be combined in the mixing zone of an extruder using heat to plastify the polymer resin, pressure to maintain the blowing agent in a liquid state, and mechanical working to obtain thorough mixing.

The blowing agent is compounded into the flowable gel in proportions to make the desired degree of expansion in the resulting foamed cellular product to make products having foamed densities down to about 0.6 pcf. Depending on the amount of blowing agent added, the resulting foamed materials may have densities from about 0.6 to 15.0 pcf.

The alcohol for crosslinking control purposes is preferably added with the blowing agent. As mentioned, the blowing agent/alcohol ratio, by weight, may vary from approximately 70/30 to 95/5.

Since the condensation reaction of silanols to siloxanes is catalyzed by the presence of certain metal catalysts such as dibutyl tin dilaurate or butyl tin maleate, it is preferred that when azido silanes are used as the crosslinking agent in the present invention, that a small amount of such catalyst also be added to the polymer melt.

The crosslinking reaction is self-controlled in the extruder by the presence of the gaseous reaction product, namely an alcohol, which limits the reaction. However, the crosslinking reaction proceeds during foam expansion at the exit of the die as the alcohol diffuses into the gaseous phase with the volatile blowing agent.

In this manner, crosslinking of the polymer gel in the extruder is controlled so that the gel remains flowable until it exits the die to a zone of lower pressure. There, the crosslinking reaction proceeds, which stabilizes gas bubble and cell formation as the olefinic polymer is expanded. Because the degree of crosslinking in the extruder can be controlled, a greater proportion of azido silane crosslinking agent may be added and, a higher degree of crosslinking in resultant polymer foam may be obtained.

Suitable azido-functional silane compounds include the group of azido trialkoxysilanes such as 2-(trimethoxysilyl) ethyl phenyl sulfonyl azide (commercially available from Petrarch Systems, Inc., Bristol, Pa.) and (triethoxy silyl) hexyl sulfonyl azide (commercially available as Azcup D-98 from Hercules, Inc., Wilmington, Del.). The azido functional silane crosslinking agent is added in an amount between about 0.01 to 2.0 parts per hundred (pph), by weight, of ethylenic or styrenic polymer. An especially preferred range of addition is between 0.02 to 1.0 pph of azido silane crosslinking agent.

The discharge end of the mixing zone of the extruder is connected, through a cooling and temperature control zone, to a die orifice. The hot polymer gel is cooled and then passed through the die orifice into a zone of lower pressure (e.g., normal ambient air atmosphere) where the blowing agent is activated and the polymer gel expands to a lower density, cellular mass. As the foamed extrusion forms, it is conducted away from the die and allowed to cool and harden.

In practice, the temperature of the feed zone is maintained at 180°±20° C., the temperature of the melting, metering, and mixing zones is maintained at 210°±20° C., and the temperature in the cooling and temperature control zone is maintained at 120°±20° C. The temperature of the polymer gel as it expands through the die orifice is preferably just above the temperature at which solid polymer would crystallize out of the gel and will vary depending upon the particular ethylenic or styrenic polymer utilized.

The resulting lightly crosslinked polymer foams comprise substantially closed-cell structures and are flexible to bending and shaping. The foams have excellent dimensional stability and high compressive strengths and heat distortion temperatures than branched low density polyethylene foams having an equivalent foam density.

As is conventional, finely divided solid materials such as talc, calcium-silicate, zinc stearate, and the like can advantageously be incorporated with the polymer gel prior to expansion. Such finely divided materials aid in controlling the size of the cells and may be employed in amounts up to five percent by weight of the polymer. Numerous fillers, pigments, lubricants, and the like well known in the art can also be incorporated as desired. Antioxidants may be added to retard or suppress the crosslinking reaction. In such an instance where antioxidant is present in or added to the polymer gel, an additional amount of crosslinking agent may be required to achieve the desired degree of crosslinking.

The specific working examples that follow are intended to illustrate the invention but are not to be taken as limiting the scope thereof. In the examples, parts and percentages are by weight unless otherwise specified or required by the context.

EXAMPLE I

The apparatus used in this example is a 1¼" screw type extruder having two additional zones for mixing and cooling at the end of usual sequential zones for feeding, melting and metering. An opening for blowing agent injection is provided on the extruder barrel between the metering and mixing zones. A small syringe-type pump is connected to the blowing agent stream for additive injections. At the end of cooling zone, there is attached a die orifice having an opening of rectangular shape. The height of the opening, called die gap hereinafter, is adjustable while its width is fixed at 0.25".

In this example, it is shown that a high temperature-resistant polyolefin foam can be produced from a blend of a linear low density polyethylene and an ethylene/acrylic acid copolymer. Thus, the polymer used in this example is a 50/50 by weight blend of a linear low density polyethylene, Dowlex 2032 (2.0 M.I., 0.926 g/cc density), and Dow PE 452, a granular copolymer of acrylic acid with ethylene (2.0 M.I., 0.932 g/cc density and 6.5% acrylic acid). Throughout the tests in this example, a small amount of talcum powder (0.2-0.7 pph) was added for cell size control. Optionally, a small amount (0.05 pph) of magnesium oxide was put in to catalyze epoxy/acid reaction.

An 80/20 by weight mixture of FC-12/FC-11 (dichlorodifluoromethane/trichloromonofluoromethane) was employed as the blowing agent in the tests of this example. Methanol was fed in the extruder in a mixture with the blowing agent in tests designed to see its effect as the reaction-delaying agent. Formulations in the test of this example are presented in Table A.

The temperatures maintained at extruder zones were approximately 120° C. at feeding zone, 190° C. at melting and metering zone and also at mixing zone. The temperature of cooling zone was maintained so that the temperature of the polymer/blowing agent mixture could reach an optimum uniform temperature for foaming which was in the range of 115°-119° C. as shown in Table A. The die gap was fixed at 0.120" throughout the tests. In some tests, foam dimensional stability at ambient temperature was followed with specimens cut to about 7 inches in length. The foam cross sectional area varied with the formulation but most had width in the range of 1.0-1.5" and thickness 0.7-1.0".

Table A shows the results of the tests. With no crosslinking, foam resulted in total collapse. Addition of epoxy functional silane made the foam rise. Magnesium oxide is shown to assist crosslinking. At a Z-6040 level of 0.3 pph with magnesium oxide incorporated, a reasonably good looking foam of substantially open cell structure was obtained. Dimensional stability of the open cell foam was naturally good. Further increase in crosslinking agent, however, made the foam strand unstable. That is, the foam strand became wobbly and in extreme cases fractured. Note that addition of crosslinking agent raises the extruder discharge pressure as much as 600 psi.

Addition of methanol dramatically reduced the line pressure as seen in Tests 9 and 10. Also, addition of methanol cured the flow instability of the extruder and further resulted in good foams having substantially closed-cell structure.

The heat distortion characteristics of the blend foam produced in Test 10 were tested against a foam produced from a low density polyethylene having 2.3 M.I. and 0.921 g/cc density. The blend foam of Test 10 had superior high temperature performance.

TABLE A

| TEST NO. | BA LEVEL (1) | MgO LEVEL (2) | Z-6040 LEVEL (3) | MeOH LEVEL (4) | GEL TEMP. (5) | EXTRUD. PRES. (6) | FOAM DENSITY (7) | CELL SIZE (8) | OPEN CELL (9) | DIMENSIONAL STABILITY (10) | FLOW STABILITY (11) |
|---|---|---|---|---|---|---|---|---|---|---|---|
| 1 | 22.1 | 0 | 0 | 0 | 118.5 | 960 | — | — | — | — | Foam Collapses |
| 2 | 21.0 | 0 | 0.2 | 0 | 117 | 1140 | 2.84 | 1.47 | 93 | — | Foam Rises |
| 3 | 21.6 | 0.05 | 0.2 | 0 | 117.5 | 1340 | 1.89 | 2.03 | 92 | — | Foam Improves |
| 4 | 21.0 | 0 | 0.3 | 0 | 117.2 | 1340 | 2.49 | 1.62 | 93 | — | Foam Improves |
| 5 | 21.1 | 0.05 | 0.3 | 0 | 117.5 | 1550 | 1.71 | 1.47 | 95 | 101 | Looks Good |
| 6 | 20.8 | 0 | 0.4 | 0 | 116 | 1510 | 1.69 | 1.62 | 91 | 97 | Unstable |
| 7 | 21.6 | 0.05 | 0.4 | 0 | 116.5 | 1520 | 1.69 | 1.62 | 84 | — | Unstable |
| 8 | 22.7 | 0 | 0.5 | 0 | 116 | 1540 | 1.51 | 1.80 | 84 | 99 | Unstable |
| 9 | 17.8 | 0 | 0.5 | 1.98 | 115 | 890 | 1.62 | 1.35 | 59 | — | Verge of Prefoaming |
| 10 | 18.5 | 0.05 | 0.5 | 2.06 | 116.5 | 1000 | 1.53 | 1.62 | 43 | 55 | Looks Good |

(1) parts of 80/20 by weight mixture of FC-12/FC-11 mixed in per hundred parts of polymer
(2) parts of magnesium oxide mixed in per hundred parts of polymer
(3) parts of Dow Corning epoxy functional silane Z-6040 mixed in per hundred parts of polymer
(4) parts of methanol mixed in per hundred parts of polymer
(5) temperature of gel coming out of the die in degrees centigrade
(6) pressure at the extruder discharge in pounds per square inch
(7) density of foam body in pounds per cubic foot measured in about one month
(8) cell size in millimeter in horizontal direction determined per ASTM D-3576
(9) open cell in percent determined per ASTM D-2856-A
(10) minimum or maximum volume of foam body during aging as percentage of initial volume measured within about five minutes after extrusion
(11) appearance of foam body being extruded out of the die orifice

EXAMPLE II

The apparatus and its operating procedure used for tests in this example were the same as in Example I.

A granular styrene/acrylic copolymer (1% acrylic acid, 200,000 M.W.) was uniformly mixed with about 0.2 pph talcum powder and 0.2 pph barium stearate. The mixture was fed into the extruder at an essentially uniform rate of about 10 pounds per hour. The blowing agent used was a 70/30 by weight mixture of dichlorodifluoromethane (FC-12) and ethanol, which was injected into the extruder at a uniform predetermined rate. The crosslinking agent used in this example is hexamethoxymethylmelamine (HMMM) (CYMEL 303 made by American Cyanamid Co.). A predetermined amount of corsslinking agent was injected in the blowing agent stream in Test Nos. 2 through 5 as shown in Table B. The extruder zones were maintained at 160°, 200° and 200° C. for feeding, melting, metering and mixing zone, respectively. The temperature of cooling zone was maintained to achieve a uniform gel temperature of 145° C. throughout the tests. When all temperatures reached a steady state, the effect of die gap on foam appearance and line pressures was determined.

After about a week, the foams were tested for high temperature resistance. Foam slugs of a about 0.25" thickness are sliced out of foam strands and subjected to hot air of predetermined temperature for one hour. Percent retention of foam volume after the test was recorded as an indication of collapse resistance.

As shown in Table B, HMMM at a level up to 0.9 pph has a minimal effect on the pressures and, accordingly, the threshold die gap for prefoaming does not vary with the HMMM level. At 0.030" die gap, good foams are made independent of HMMM level. The results clearly substantiate that alcohol, indeed, delays the crosslinking reaction in the foam extrusion line.

TABLE B

| TEST NO. | BA LEVEL (1) | HMMM LEVEL (2) | DIE GAP (3) | DIE PRES. (4) | EXTR. PRES. (5) | FOAM THICK. (6) | FOAM WIDTH (7) | FOAM DENS. (8) |
|---|---|---|---|---|---|---|---|---|
| 1 | 1.45 | — | 0.030 | 460 | 660 | 0.50 | 1.12 | 1.74 |
| 2 | 1.44 | 0.2 | 0.030 | 480 | 700 | 0.47 | 1.22 | 2.10 |
| 3 | 1.46 | 0.5 | 0.030 | 520 | 750 | 0.53 | 1.21 | 1.85 |
| 4 | 1.47 | 0.7 | 0.030 | 520 | 760 | 0.50 | 1.27 | 1.86 |
| 5 | 1.47 | 0.9 | 0.030 | 510 | 740 | 0.50 | 1.34 | 1.86 |

| TEST NO. | CELL SIZE (9) | PREFOAMING (?) (10) | COLLAPSE RESISTANCE (11) | | | | |
|---|---|---|---|---|---|---|---|
| | | | 100 | 110 | 115 | 120 | 125° C. |
| 1 | 0.44 | verge | 136 | 182 | 227 | 32 | 15 |
| 2 | 0.49 | verge | 140 | 182 | 232 | 39 | 19 |
| 3 | 0.42 | verge | 143 | 184 | 229 | 46 | 21 |
| 4 | 0.31 | verge | 145 | 184 | 232 | 47 | 23 |

TABLE B-continued

| 5 | 0.45 | no | 145 | 185 | 226 | 50 | 25 |

(1) parts of 70/30 by weight mixture of dichlorodifluoromethane and ethanol mixed in per hundred parts of polymer
(2) parts of hexamethoxymethylmelamine (CYMEL 303 made by American Cynamid) mixed in per hundred parts of polymer
(3) the gap of die opening in inches
(4) pressure at the die in pounds per square inch
(5) pressure at the extruder discharge in pounds per square inch
(6) thickness of foam body in inches
(7) width of foam body in inches
(8) density of foam body in pounds per cubic foot determined after 6 months aging
(10) condition of foam strand coming out of the die: blips = blow holes, verge = verge of prefoaming, no = no foaming
(11) foam volume as a percentage of the initial after aging in an oven of given temperature for one hour

EXAMPLE III

In the tests in this example, there were used the same apparatus, its operating procedure, polymer, blowing agent and cell size control agent as used in Example II. Additionally, there were added one pph FR651A and 0.03 pph magnesium oxide. FR651A is a flame retardant manufactured by Dow Chemical Company. The extruder zones were set down a little to prevent decomposition of the flame retardant: 140°, 170° and 176° C. for feeding, melting, metering and mixing zone, respectively. The gel temperature was varied slightly as presented in Table C.

As shown in Table C, HMMM has little impact on die pressure and extruder discharge pressure manifesting the inhibiting effect of alcohol. The most remarkable thing with the formulations is improvement in collapse resistance. The threshold temperature for collapse, as defined by the maximum temperature at which foam retains at least 90% of its original volume, increases with the HMMM level. It increases from 120° to 125° C. for formulations containing 0.5 to 0.9 pph, 140° C. for one containing 1.0 pph and 160° C. for one with 2.0 pph HMMM. It appears that the flame retardant additive catalyzes the crosslinking reaction and that the HMMM needs to exceed about 1.0 pph to impart significant thermo-collapse resistance to a foam product. However, it is possible to lower the required level by adding the more potent external catalyst such a paratoluenesulfonic acid.

TABLE C

| TEST NO. | BA LEVEL (1) | HMMM LEVEL (2) | FOAMING GEL TEMP. (12) | DIE GAP (3) | DIE PRES. (4) | EXTR. PRES. (5) | FOAM THICK. (6) | FOAM WIDTH (7) | FOAM DENS. (8) |
|---|---|---|---|---|---|---|---|---|---|
| 1 | 1.14 | — | 135 | 0.040 | 450 | 710 | 0.58 | 1.28 | 2.53 |
| 2 | 1.49 | 0.5 | 144 | 0.030 | 540 | 750 | 0.52 | 1.30 | 2.05 |
| 3 | 1.41 | 0.7 | 144 | 0.030 | 510 | 720 | 0.51 | 1.23 | 1.99 |
| 4 | 1.48 | 0.9 | 144 | 0.030 | 480 | 700 | 0.44 | 1.21 | 1.92 |
| 5 | 1.31 | 1.0 | 135 | 0.040 | 440 | 680 | 0.63 | 1.28 | 2.02 |
| 6 | 1.31 | 2.0 | 135 | 0.040 | 435 | 720 | 0.54 | 1.28 | 2.29 |

| TEST NO. | CELL SIZE (9) | PREFOAMING (?) (10) | COLLAPSE RESISTANCE (11) | | | | | | | |
|---|---|---|---|---|---|---|---|---|---|---|
|  |  |  | 110 | 120 | 125 | 130 | 140 | 150 | 160 | 170° C. |
| 1 | 0.90 | no | 221 | 207 | 45 | 34 | 21 | ND | ND | ND |
| 2 | 0.46 | verge | 177 | 212 | 99 | 80 | 36 | ND | ND | ND |
| 3 | 0.29 | no | 179 | 225 | 105 | 74 | 29 | ND | ND | ND |
| 4 | 0.28 | verge | 167 | 201 | 95 | 66 | 28 | ND | ND | ND |
| 5 | 0.56 | verge | 202 | 303 | 295 | 189 | 103 | 63 | 46 | 26 |
| 6 | 0.35 | verge | 202 | 267 | 289 | 292 | 241 | 158 | 118 | 89 |

ND = not determined
(1) parts of 70/30 by weight mixture of dichlorodifluoromethane and ethanol mixed in per hundred parts of polymer
(2) through (11) = the same as in Table B
(12) temperature of foaming gel in degrees centigrade

Example IV

The apparatus and its operating procedure used in this example was the same as in Example II. An ethylene/acrylic acid copolymer having 6.5% acrylic acid and 2.0 melt index was evaluated in this work. HMMM (CYMEL 303) was used as the crosslinking agent and talcum powder as the cell size control agent. Three different types of blowing agents, as shown in Table D, were employed to observe the effect of alcohol. The zones of extruder were set at 150°, 180° and 180° C. for feeding, melting, metering and mixing zone, respectively. The gel temperature was maintained at 100°, 104° and 102° C. for FC-12, FC-12/EtOH and FC-114/MeOH blowing agent, respectively.

Table D sets forth the test results. With the absence of alcohol in Test No. 2, 0.2 pph HMMM is sufficient to overcrosslink the polymer in the foam extrusion line. Melt fracture of the foam strand accompanied with a sharp increase in line pressure plagues the test. Test Nos. 4 and 6 demonstrate the reaction-delaying effect of alcohol. At a HMMM level as high as 1.5 pph, good foams are made without a large increase in pressures and flow instability. The crosslinked foams show improvement of collapse resistance. The foam made in Test No. 6 contined 42% insoluble gel after an extraction test in boiling xylene for 24 hours and the polymer was no longer flowable.

TABLE D

| TEST NO. | BLOWING AGENT TYPE LEVEL (12) | (pph) (1) | TALC LEVEL (13) | HMMM LEVEL (2) | DIE GAP (3) | DIE PRES. (4) | EXTR. PRES. (5) | FOAM THICK. (6) | FOAM WIDTH (7) |
|---|---|---|---|---|---|---|---|---|---|
| 1 | FC-12 | 20.3 | 0.3 | — | 0.18 | 430 | 1210 | 1.44 | 1.51 |
| 2 | FC-12 | 21.6 | 0.3 | 0.2 | 0.18 | 600 | 1720 | 1.42 | 1.60 |
| 3 | FC-12/EtOH:80/20 | 18.8 | 0.4 | — | 0.13 | 380 | 890 | 1.23 | 1.45 |
| 4 | FC-12/EtOH:80/20 | 18.8 | 0.4 | 0.7 | 0.13 | 435 | 980 | 1.24 | 1.64 |
| 5 | FC-114/MeOH:90/10 | 24.3 | 0.6 | — | 0.10 | 405 | 1040 | 0.89 | 1.36 |
| 6 | FC-114/MeOH:90/10 | 24.4 | 0.6 | 1.5 | 0.10 | 455 | 1210 | 0.79 | 1.35 |

| TEST NO. | BLOWING AGENT TYPE LEVEL (12) | FOAM DENS. (8) | CELL SIZE (9) | PREFOAMING (?) (10) | COLLAPSE RESISTANCE (11) 95 | 100 | 105 | 110 | 115° C. |
|---|---|---|---|---|---|---|---|---|---|
| 1 | FC-12 | 1.61 | 1.01 | verge | 96 | 87 | 31 | 30 | ND |
| 2 | FC-12 | 2.18 | 1.62 | melt fract | 88 | 80 | 26 | 13 | ND |
| 3 | FC-12/EtOH:80/20 | 1.97 | 1.25 | no | 100 | 97 | 56 | 40 | 29 |
| 4 | FC-12/EtOH:80/20 | 1.89 | 1.25 | no | 99 | 98 | 85 | 71 | 62 |
| 5 | FC-114/MeOH:90/10 | 1.61 | 1.01 | no | 95 | 89 | 17 | 13 | ND |
| 6 | FC-114/MeOH:90/10 | 1.76 | 1.08 | no | 93 | 82 | 49 | 31 | 41 |

ND = not determined
(1) parts of blowing agent mixed in per hundred parts of polymer
(2) through (11) = the same as in Table B
(12) FC-12 = dichlorofluoromethane, FC-114 = dichlorotetrafluoroethane, EtOH = ethanol, MeOH = methanol
(13) parts of talcum powder mixed in per hundred parts of polymer

EXAMPLE V

The apparatus used in this example is the same as that used in Example I.

The polymer used in this example was a terpolymer of styrene, acrylonitrile and hydroxy ethylacrylate (75% styrene, 25% acrylonitrile and 0.22% HEA) having about 157,000 molecular weight. The polymer was fed into the extruder at an essentially uniform rate of about 10 pounds per hour. A 70/30 by weight mixture of fluorocarbon 12 (FC-12) and isopropyl alcohol (i-PrOH) was premixed and injected into the extruder at a uniform rate of about 1.6 pounds per hour. For tests incorporating titanium isopropoxide, a predetermined amount of the crosslinking agent was premixed with the blowing agent so that the aimed level could be achieved in the final composition. The extruder zones were maintained at about 170°, 190° and 200° C. for feeding, melting, metering, and mixing zone, respectively. The temperature of the cooling zone was adjusted so that the gel would reach a uniform temperature for optimum foam expansion.

Good quality foams were achieved from the polymer with or without the addition of titanium isopropoxide. As set forth in Table E, the line pressures went up slightly but the increases were probably due to the slight drop in the foaming gel temperature. The increase of the die pressure within the tolerable range is desirable in the extrusion process since the enhanced die pressure permits us to achieve the larger foam cross-section without incurring prefoaming. A control formulation, i.e., without crosslinking agent, Test 1, resulted in prefoaming at the given condition while those containing titanium isopropoxide crosslinking agent produced good foams free from prefoaming. The foam strands had oval cross-section of about 0.7–1.0 inches in the smaller diameter and 1.0–1.4" in the larger diameter. As shown in Table F, the foams had densities of about 2.4–2.5 pcf and expansion ratios of about 24–27. The expansion ratio is defined by the ratio of specific foam volume to polymer volume.

The distinct benefit of titanium isopropoxide addition was seen during secondary expansions of the foam products with hot air or atmospheric steam. As shown in Table F, titanium isopropoxide makes the foams expand significantly better in both air and steam. Its effect is most pronounced in steam expansion. The foam made with 0.34 pph titanium isopropoxide expands to a size almost twice as large as the control. The highly expanded foam products were light and resilient with their thin flexible cells walls. The details of expansion procedures are described below.

For both expansion tests, foams aged for about a week were employed. For hot air expansion tests, foam strands were sliced to about ¾" in length. The specimens were subjected to hot air in a convective oven maintained at a predetermined constant temperature for one hour. The weight and volume of a foam specimen before and after the expansion test were determined and the expansion ratios were calculated. Among five different temperatures tried ranging from 100° to 120° C., 110° C. provided the best expansions for all compositions and thus the results are reported in Table E.

For steam expansion tests, foams were sliced to about ¼" thick slugs and subjected to atmospheric steam for various periods ranging from five seconds to two hours. Foam specimens having undergone expansions exceeding about 60 expansion ratio shriveled when taken out of the steam but substantially recovered in about two days. The expansion ratios reported in Table F are based on the steady state volume determined in five days. All foams attained the maximum expansions during 7 to 15 min. exposure to steam which are set forth in Table F. The longer exposure to steam resulted in gradual deterioration of expansion.

All foams were found soluble in methyl ethyl ketone (MEK). Approximately 0.2 g of each foam was dissolved in about 25 ml of MEK. The result indicates that there may develop some build-up of molecular weight but a high level of crosslinking does not occur with the polymer at the given level of crosslinking agent. Probably, the titanate plasticizes the polymer and extends the polymer chain slightly resulting in the favorable steam expansions.

TABLE E

| TEST NO. | BA LEVEL (pph) (1) | TPT LEVEL (pph) (2) | FOAMING TEMP. (C.°) (3) | DIE PRES. (psi) (4) | EXTRUD. PRES. (psi) (5) | FOAM DENSITY (pcf) (6) | INITIAL EXPANSION RATIO (7) |
|---|---|---|---|---|---|---|---|
| 1 | 15.6 | — | 134 | 490 | 1600 | 2.40 | 27 |
| 2 | 16.0 | 0.2 | 133 | 580 | 1790 | 2.46 | 24 |
| 3 | 16.0 | 0.34 | 132 | 680 | 1900 | 2.40 | 25 |

| | EXPANSION IN HOT AIR (Expansion Ratio) (8) | | | EXPANSION IN STEAM (Expansion Ratio) (9) | | | | | |
|---|---|---|---|---|---|---|---|---|---|
| TEST NO. | 100° C. | 110° C. | 120° C. | 10 sec | 1 min | 10 min | 45 min | max (10) | max time (min) (11) |
| 1 | 33 | 38 | 6.3 | 49 | 76 | 90 | 35 | 101 | 15 |
| 2 | 36 | 41 | 6.4 | 54 | 75 | 126 | 19 | 150 | 7 |
| 3 | 39 | 49 | 8.2 | 57 | 101 | 109 | 28 | 182 | 7 |

All tests were run at the following conditions:
Nucleator type and level : 0.1 pph BaSt 0.1 pph talc Die gap : 0.110"
(1) Parts of a 70/30 mixture of fluorocarbon 12/isopropyl alcohol mixed in a per hundred parts of polymer
(2) Parts of titanium isopropoxide mixed in per hundred parts of polymer
(3) Temperature of foaming gel in degrees centigrade
(4) Pressure at the die in pounds per square inch
(5) Pressure at the extruder discharge in pounds per square inch
(6) Density in pounds per cubic foot of foam body aged for about a week
(7) Expansion ratio of foam body determined prior to secondary expansions which were conducted in about a week
(8) Expansion ratio of foam body after exposure to hot air at the specified temperature for one hour
(9) Expansion ratio of foam body after exposure to atmospheric steam for the specified time and aging for 5 days
(10) Maximum expansion ratio of foam body after expansion in steam
(11) Steam exposure time corresponding to the maximum expansion ratio

EXAMPLE VI

The apparatus used in this example is as in Example I.

A granular linear low density polyethylene (LLDPE) having 1.0 melt index (ASTM D-1238-79 Condition E) and 0.935 g/cc density, was uniformly mixed with 0.1 pph dibutyl tin dilaurate condensation catalyst (commercially available under the designation T-12 from M&T Chemicals, Inc.) and 0.1 pph talcum powder. The mixture was fed into the extruder at an essentially uniform rate of about 10 pounds per hour. An 80/20 of FC-12/ethanol blowing agent was injected into the extruder at a rate of 19.9 pph. The temperatures maintained at the extruder zones were 170° C. at feeding zone, 220° C. at melting and metering zone, and 220° C. at mixing zone. The temperature of the cooling zone was adjusted so that the gel could be cooled down to about 123° C. throughout the tests.

Again, alcohol suppressed line pressures for formulations crosslinked with azido functional silane. Good quality foams were obtained at the silane levels of 0.1 to 0.15 pph. At 0.25 pph silane level, the foam strand fractured signifying over-crosslinking. The foams made with 0.15 and 0.25 pph silane showed some thermo-collapse resistance during oven aging tests. That is, these foams retained over 50% of their original volume during aging in 130° C. oven for one hour while the control and those containing a lower level of silane collapsed totally during the test.

TABLE F

| TEST NO. | BA LEVEL (pph) (1) | AZIDO SILANE LEVEL (pph) (2) | GEL TEMP. (°C.) (3) | DIE GAP (in) (4) | DIE PRESS. (psig) (5) | EXTRUDER PRESS. (psig) (6) |
|---|---|---|---|---|---|---|
| 1 | 18.0 | — | 123 | 0.115 | 278 | 1350 |
| | | | | 0.105 | 290 | 1390 |
| | | | | 0.080 | 315 | 1380 |
| | | | | 0.075 | 320 | 1390 |
| | | | | 0.070 | 369 | 1405 |
| 2 | 18.0 | 0.05 | 123 | 0.090 | 322 | 1440 |
| | | | | 0.080 | 380 | 1460 |
| | | | | 0.075 | 385 | 1480 |
| | | | | 0.070 | 360 | 1570 |
| 3 | 18.0 | 0.075 | 123 | 0.090 | 365 | 1480 |
| | | | | 0.080 | 343 | 1510 |
| | | | | 0.075 | 350 | 1320 |
| 4 | 18.7 | 0.10 | 123 | 0.090 | 400 | 1520 |
| | | | | 0.080 | 410 | 1550 |
| | | | | 0.075 | 437 | 1605 |
| 5 | 18.7 | 0.15 | 123 | 0.090 | 418 | 1610 |
| | | | | 0.080 | 460 | 1660 |
| | | | | 0.075 | 558 | 1770 |
| 6 | 18.0 | 0.25 | 123 | 0.160 | 483 | 1750 |
| | | | | 0.150 | 500 | 1910 |

| TEST NO. | FOAM THICK. (in) (7) | FOAM WIDTH (in) (8) | FOAM DENSITY (pcf) (9) | CELL SIZE (mm) (10) | OPEN CELL (%) (11) | FOAM APPEAR. (12) | FLOW STAB. (13) |
|---|---|---|---|---|---|---|---|
| 1 | 0.66 | 0.96 | 1.78 | 0.56 | 67 | PC | — |
| | 0.71 | 1.20 | 1.77 | 0.50 | 68 | B | R |

TABLE F-continued

|   | 0.48 | 1.01 | 1.74 | 0.98 | 50 | B   | R |
|---|------|------|------|------|----|-----|---|
|   | 0.52 | 0.90 | 1.59 | 0.46 | 28 | G   | R |
|   | 0.45 | 0.95 | 1.70 | 0.54 | 15 | E   | G |
| 2 | 0.52 | 0.95 | 1.52 | 0.59 | 16 | B,H | R |
|   | 0.54 | 1.06 | 1.33 | 0.46 | 16 | G   | R |
|   | 0.48 | 0.97 | 1.48 | 0.54 | 20 | E   | R |
|   | 0.54 | 1.05 | 1.42 | 0.33 | 11 | E   | E |
| 3 | 0.60 | 0.90 | 1.65 | 0.45 | 19 | H   | R |
|   | 0.55 | 1.02 | 1.59 | 0.46 | 20 | E   | R |
|   | 0.53 | 0.98 | 1.54 | 0.41 | 15 | E   | E |
| 4 | 0.61 | 0.91 | 1.58 | 0.39 | 16 | H   | R |
|   | 0.55 | 1.05 | 1.87 | 0.40 | 20 | G   | R |
|   | 0.54 | 1.06 | 1.48 | 0.38 | 8  | E   | E |
| 5 | 0.54 | 1.05 | 1.60 | 0.46 | 14 | G   | R |
|   | 0.54 | 1.03 | 1.80 | 0.35 | 9  | E   | R |
|   | 0.56 | 1.08 | 1.46 | 0.42 | 7  | E   | E |
| 6 | 1.02 | 1.19 | 1.52 | 0.41 | 16 | E   | F |
|   | 1.06 | 1.25 | 1.57 | 0.39 | 12 | E   | F |

(1) an 80/20 by weight mixture of FC-12 and ethanol mixed in per hundred parts of polymer
(2) parts of effective azido functional silane mixed in per hundred parts of polymer; the azidosilane used was C-T2905, 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture, G = good, E = excellent

EXAMPLE VII

In this example, the same apparatus as in Example I was used. A high density polyethylene (HDPE) having 0.6 melt index (ASTM D-1238-79 Condition E) and 0.963 g/cc density was used in this example. The polymer granules were mixed with 0.05 pph talc and 0.05 pph organotin catalyst (T-12). The mixture was fed into the extruder at 10 pounds per hour. Extruder zones were maintained at 160, 200 and 200° C. for feeding, melting and metering, and mixing zone, respectively. The gel temperaure was maintained at about 130° C. and a 90/10 mixture of FC-12/EtOH was used as the blowing agent. The test results are presented in Table G.

Again, the silane crosslinking agent aided in foam processing and alcohol suppressed development of crosslinking in the extrusion line. At a low silane level, improvements were seen in one or more performance areas. For example, even at 0.05 pph silane level, foam density dropped significantly from the control. At 0.15 pph silane level, good quality foams were produced with a noticeable increase in the die pressure. Interestingly, the pressure at extruder discharge increased little at this silane level. This is an advantage in foam extrusion process since we like to have a high die pressure to prevent prefoaming but a low extruder discharge pressure to facilitate polymer extrusion. The trend indicates that the alcohol-containing blowing agent called for a silane level higher than 0.15 pph for the optimum results.

TABLE G

| TEST NO. | BA LEVEL (pph) (1) | AZIDO SILANE LEVEL (pph) (2) | GEL TEMP. (°C) (3) | DIE GAP (in) (4) | DIE PRESS. (psig) (5) | EXTRUDER PRESS. (psig) (6) |
|---|---|---|---|---|---|---|
| 1 | 17.8 | — | 129 | 0.105 | 265 | 1200 |
|   |      |   |     | 0.100 | 260 | 1190 |
| 2 | 17.8 | 0.05 | 130 | 0.105 | 260 | 1180 |
| 3 | 17.8 | 0.075 | 130 | 0.105 | 300 | 1190 |
| 4 | 17.8 | 0.10 | 130 | 0.110 | 288 | 1160 |
|   |      |   |     | 0.105 | 280 | 1160 |
|   |      |   |     | 0.100 | 300 | 1160 |
| 5 | 17.8 | 0.15 | 130 | 0.110 | 310 | 1200 |
|   |      |   |     | 0.105 | 310 | 1195 |
|   |      |   |     | 0.100 | 380 | 1250 |

| TEST NO. | FOAM THICK. (in) (7) | FOAM WIDTH (in) (8) | FOAM DENSITY (pcf) (9) | CELL SIZE (mm) (10) | OPEN CELL (%) (11) | FOAM APPEAR. (12) | FLOW STAB. (13) |
|---|---|---|---|---|---|---|---|
| 1 | 0.76 | 1.19 | 2.27 | 0.45 | 84.2 | B | W |
|   | 0.82 | 1.17 | 2.19 | 0.41 | 82.9 | V | W |
| 2 | 0.71 | 1.18 | 1.75 | 0.48 | 87.4 | V | W |
| 3 | 0.83 | 1.20 | 1.80 | 0.48 | 87.7 | V | W |
| 4 | 0.78 | 1.16 | 1.81 | 0.39 | 84.7 | V | W |
|   | 0.70 | 1.07 | 1.76 | 0.40 | 85.9 | V | G |

TABLE G-continued

|   | 0.78 | 1.22 | 1.66 | 0.70 | 61.8 | V | W |
|---|------|------|------|------|------|---|---|
| 5 | 0.96 | 1.24 | 1.50 | 0.74 | 57.3 | G | G |
|   | 0.80 | 1.18 | 1.49 | 0.60 | 56.5 | G | G |
|   | 0.95 | 1.21 | 1.44 | 0.90 | 46.8 | G | G |

(1) parts of 90/10 by weight mixture of FC-12/ethanol mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C=total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture, G = good, E = excellent

EXAMPLE VIII

The same apparatus used in Example I was used in this example. The polymer feedstock employed in this example was an 80/20 mixture of a linear low density polyethylene (1.0 M.I., 0.935 g/cc density) and a polystyrene having an average molecular weight of about 200,000. Two granular polymers were blended by use of a tumbler, mixed with 0.1 pph talc and 0.05 pph organo-tin catalyst (T-12) and fed to the extruder at an essentially uniform rate of 10 pounds per hour. A 95/5 by weight mixture of FC-12/ethanol was injected into the extruder at a rate of approximately 21.0 pph. Extruder zones were maintained at 145°, 195° and 205° C., for feeding, melting and metering, and mixing zone, respectively. The gel was cooled down to an essentially uniform temperature of about 122° C. The test results are shown in Table H.

This particular polymer blend provided reasonably good foam without crosslinking when the die gap was closed down to 0.050 inch. The foam had a small cross section and a relatively high level of open cells. At a larger die gap, foam collapsed partially. Foam improved progressively with the azido functional silane level. At a silane level of 0.15 pph or higher, superb-looking foams were obtained having a lower density, larger cross-section, and lower open cell content. At a silane level as high as 0.25 pph, there was no sign of over-crosslinking.

The foams thus produced also had excellent dimensional stability during aging without suffering any shrinkage. The heat distortion temperature of the blend foams was about 110° C.

TABLE H

| TEST NO. | BA LEVEL (pph) (1) | AZIDO SILANE LEVEL (pph) (2) | GEL TEMP. (°C.) (3) | DIE GAP (in) (4) | DIE PRESS. (psig) (5) | EXTRUDER PRESS. (psig) (6) |
|---|---|---|---|---|---|---|
| 1 | 20.3 | — | 122 | 0.070 | 328 | 1020 |
|   |      |    |     | 0.065 | 332 | 1040 |
|   |      |    |     | 0.060 | 342 | 1050 |
|   |      | ND |     | 0.055 | 348 | 1070 |
|   |      |    | 20.7 | 0.050 | 430 | 1150 |
| 2 | 21.0 | 0.1 | 122 | 0.070 | 330 | 1040 |
|   |      |     |     | 0.065 | 330 | 1050 |
|   |      |     |     | 0.060 | 332 | 1060 |
|   |      |     |     | 0.055 | 339 | 1090 |
|   |      |     |     | 0.050 | 420 | 1250 |
| 3 | 21.0 | 0.15 | 122 | 0.080 | 365 | 1150 |
|   |      |      |     | 0.070 | 372 | 1180 |
|   |      |      |     | 0.065 | 380 | 1200 |
|   |      |      |     | 0.060 | 390 | 1240 |
|   |      |      |     | 0.055 | 442 | 1330 |
| 4 | 21.0 | 0.2 | 122 | 0.080 | 410 | 1220 |
|   |      |     |     | 0.075 | 415 | 1250 |
|   |      |     |     | 0.070 | 425 | 1300 |
| 5 | 21.0 | 0.25 | 122 | 0.080 | 440 | 1325 |
|   |      |      |     | 0.075 | 460 | 1350 |
|   |      |      |     | 0.070 | 510 | 1600 |

| TEST NO. | FOAM THICK. (in) (7) | FOAM WIDTH (in) (8) | FOAM DENSITY (pcf) (9) | CELL SIZE (mm) (10) | OPEN CELL (%) (11) | FOAM APPEAR. (12) | FLOW STAB. (13) |
|---|---|---|---|---|---|---|---|
| 1 | 0.42 | 1.06 | 1.91 | 0.42 | 92.9 | PC | — |
|   | 0.43 | 1.03 | 2.14 | 0.44 | 93.2 | PC | — |
|   | 0.42 | 1.04 | 1.76 | 0.43 | 95.6 | PC | — |
|   | ND | ND | ND | ND | ND | B | W,R |
|   | 0.53 | 1.17 | 1.39 | 0.32 | 20.7 | E | E |
| 2 | 0.66 | 1.10 | 2.00 | 0.42 | 92.9 | PC | — |
|   | 0.43 | 1.05 | 1.51 | 0.39 | 87.9 | PC | — |
|   | 0.44 | 1.03 | 1.70 | 0.43 | 85.9 | B | W |

TABLE H-continued

|   | 0.43 | 1.10 | 2.15 | 0.40 | 83.8 | B | W |
|---|------|------|------|------|------|---|---|
|   | 0.50 | 1.28 | 1.44 | 0.32 | 7.20 | E | G |
| 3 | 0.70 | 1.14 | 1.45 | 0.46 | 50.1 | B | W |
|   | 0.65 | 1.24 | 1.42 | 0.32 | 36.3 | V | W |
|   | 0.60 | 1.14 | 1.26 | 0.35 | 22.9 | V | G |
|   | 0.63 | 1.17 | 1.32 | 0.35 | 10.1 | E | G |
|   | 0.60 | 1.25 | 1.19 | 0.32 | 8.1  | E | E |
| 4 | 0.75 | 1.18 | 1.24 | 0.34 | 3.7  | V | W |
|   | 0.70 | 1.20 | 1.41 | 0.37 | 10.0 | E | E |
|   | 0.72 | 1.25 | 1.38 | 0.40 | 8.5  | E | E |
| 5 | 0.72 | 1.28 | 1.26 | 0.36 | 9.2  | E | G |
|   | 0.77 | 1.22 | 1.42 | 0.37 | 15.4 | E | E |
|   | 0.75 | 1.28 | 1.17 | 0.36 | 11.0 | E | E |

WD = not determined
(1) parts of 95/5 by weight mixture of FC-12/ethanol mixed in per hundred parts of polymer
(2) parts of effective azido functional silane mixed in per hundred parts of polymer; the azido silane used was C-T2905, a 50/50 by weight solution of 2-(trimethoxysilyl ethylphenylsulfonyl azide) in methylene chloride marketed by Petrarch Systems, Inc.
(3) temperature in degrees centigrade to which the gel was cooled down prior to foam expansion
(4) gap of die opening in inches at which samples were taken
(5), (6) pressure in pounds per square inch at the die and at the extruder discharge, respectively
(7), (8) thickness and width of foam body in inches measured within about five minutes after extrusion
(9) density of foam body in pounds per cubic foot measured in about one month
(10) open cell content in percent determined per ASTM D-2856-A
(11) cell size in millimeter in horizontal direction determined per ASTM D-3576
(12) subjective judgment of foam appearance; C = total collapse, PC = partial collapse, O = open cells, B = blips or large voids contained in the foam, V = voids of smaller dimensions contained in the foam, H = hairy skin originating from prefoaming, G = good, E = excellent
(13) the behavior of extrudate; W = wobbly strand, S = surging, R = ripples at the edges, F = melt fracture, G = good, E = excellent

EXAMPLE IX

The apparatus in this example is the same as in Example I. The polymer feedstock employed for tests in this example was a 50/50 by weight blend of polystyrene with Mw 200,000 and polystyrene with Mw 300,000. Approximately 0.05 pph T-12, 0.1 pph barium stearate and 0.1 pph talcum powder were mixed in the granular blend of two polystyrenes and fed into the extruder at a uniform rate of 10 pounds per hour. A 70/30 by weight mixture of FC-12 and isopropyl alcohol was used as the blowing agent. The level of azido silane crosslinking agent (2-trimethoxyoilyl ethyl phenyl sulfonyl) azide, was varied up to 0.45 pph. The extruder zones were maintained at about 170°, 200° and 200° C. for feeding, melting and metering, and mixing zone, respectively. The temperature of the cooling zone was adjusted so that the gel could reach an essentially uniform temperature of about 135° C.

When the operating condition reached an essentially steady state, the effects of die opening on foam appearance and line pressures were studied. Foam samples were taken both at the threshold die gap for prefoaming and at a fixed die gap for a given blowing agent system. Property determination and secondary foaming tests were conducted. The foam samples were aged for about one month.

Secondary foaming was conducted both by atmospheric steam and by hot air. Foam slugs of about 0.25" thickness were sliced out of foam strands and aged for about one day at ambient temperature prior to secondary expansions. After exposure to atmospheric steam for varying lengths of time, foam specimens were aged at ambient temperature while their weights and volumes were monitored. Highly expanded foam specimens shrank when taken out of steam but recovered to the final steady state volume in about two days. Expansion tests in hot air were conducted similarly with the exception that expansion or shrinkage of a foam specimen in the oven was permanent not needing ambient aging for volume recovery.

The process data set forth in Table I manifest the crosslinking-delaying effect of alcohol in the foam extrusion line. With this blowing agent also, we see the general effects of azido silane on foam extrusion and secondly expansions.

TABLE Ia

| TEST NO. | BLOWING AGENT TYPE (1) | BLOWING AGENT RATIO (2) | BLOWING AGENT LEVEL (3) | AZIDO SILANE LEVEL (4) | FOAMING GEL TEMP. (5) | THRESHOLD FOR PREFOAMING DIE GAP (6) | DIE PRESS. (7) | FOAM THICK. (8) | FOAM WIDTH (9) |
|---|---|---|---|---|---|---|---|---|---|
| 1 | FC-12/i-PrOH | 70/30 | 15.0 | — | 134 | 0.071 | 490 | 0.65 | 1.11 |
| 2 | FC-12/i-PrOH | 70/30 | 15.0 | 0.05 | 134 | 0.071 | 485 | 0.74 | 1.10 |
| 3 | FC-12/i-PrOH | 70/30 | 15.0 | 0.1  | 134 | 0.071 | 485 | 0.77 | 1.27 |
| 4 | FC-12/i-PrOH | 70/30 | 15.0 | 0.15 | 134 | 0.071 | 470 | 0.76 | 1.12 |
| 5 | FC-12/i-PrOH | 70/30 | 15.0 | 0.20 | 134 | 0.071 | 465 | 0.79 | 1.17 |
| 6 | FC-12/i-PrOH | 70/30 | 15.1 | 0.25 | 135 | 0.071 | 510 | 0.80 | 1.17 |
| 7 | FC-12/i-PrOH | 70/30 | 15.1 | 0.35 | 135 | 0.080 | 415 | 0.96 | 1.32 |
| 8 | FC-12/i-PrOH | 70/30 | 15.1 | 0.45 | 135 | 0.080 | 445 | 0.97 | 1.43 |

| TEST NO. | SAMPLING DIE GAP (10) | DIE PRESS. (11) | EXTRUDER PRESS. (12) | FOAM THICK. (13) | FOAM WIDTH (14) | FOAM DENSITY (15) | CELL SIZE (16) |
|---|---|---|---|---|---|---|---|
| 1 | 0.071 | 490 | 910 | 0.65 | 1.11 | 2.12 | 0.37 |
| 2 | 0.071 | 485 | 950 | 0.74 | 1.10 | 1.87 | 0.39 |
| 3 | 0.071 | 485 | 950 | 0.77 | 1.27 | 1.90 | 0.37 |
| 4 | 0.071 | 470 | 950 | 0.76 | 1.12 | 1.85 | 0.49 |
| 5 | 0.071 | 465 | 930 | 0.79 | 1.17 | 1.76 | 0.46 |

TABLE Ia-continued

| | | | | | | | |
|---|---|---|---|---|---|---|---|
| 6 | 0.071 | 510 | 1040 | 0.80 | 1.33 | 1.99 | 0.65 |
| 7 | 0.071 | 515 | 1000 | 0.89 | 1.13 | 1.90 | 0.74 |
| 8 | 0.071 | 565 | 1050 | 0.85 | 1.45 | 1.95 | 0.52 |

(1) FC-12 = dichlorodifluoromethane, i-PrOH = isopropyl alcohol
(2) mixture ratio by weight of the component blowing agents
(3) parts of blowing agent mixed in per hundred parts of polymer
(4) parts of azido functional silane mixed in per hundred parts of polymer
(5) temperature of foaming gel in degrees centigrade
(6) the gap of die opening in inches at the threshold of prefoaming
(7) pressure at the die in pounds per square inch at the threshold of prefoaming
(8) thickness of foam body in inches at the threshold of prefoaming
(9) width of foam body in inches at the threshold of prefoaming
(10) the gap of die opening in inches where the foam sample was taken
(11) pressure at the die in pounds per square inch at the sampling die opening
(12) pressure at the extruder discharge in pounds per square inch at the sampling die opening
(13) thickness of foam body in inches determined after aging for about a month
(14) width of foam body in inches determined after aging for about a month
(15) density of foam body in pounds per cubic foot determined after aging for about a month
(16) cell size in millimeter in horizontal direction determined per ASTM D-3576

TABLE Ib

| TEST NO. | BLOWING AGENT TYPE (1) | RATIO (2) | LEVEL (3) | AZIDO SILANE LEVEL (4) | INITIAL EXPANSION RATION (5) |
|---|---|---|---|---|---|
| 1 | FC-12/i-PrOH | 70/30 | 15.0 | — | 30.1 |
| 2 | FC-12/i-PrOH | 70/30 | 15.0 | 0.05 | 30.6 |
| 3 | FC-12/i-PrOH | 70/30 | 15.0 | 0.1 | 29.0 |
| 4 | FC-12/i-PrOH | 70/30 | 15.0 | 0.15 | 31.5 |
| 5 | FC-12/i-PrOH | 70/30 | 15.0 | 0.2 | 32.1 |
| 6 | FC-12/i-PrOH | 70/30 | 15.1 | 0.25 | 29.7 |
| 7 | FC-12/i-PrOH | 70/30 | 15.1 | 0.35 | 31.1 |
| 8 | FC-12/i-PrOH | 70/30 | 15.1 | 0.45 | 31.3 |

| TEST NO. | EXPANSION RATIO AFTER EXPANDING IN STEAM FOR (6) | | | | | | | | | | | | |
|---|---|---|---|---|---|---|---|---|---|---|---|---|---|
| | 15 sec. | 30 sec. | 1 min. | 3 min. | 5 min. | 7 min. | 10 min. | 12 min. | 15 min. | 20 min. | 30 min. | 45 min. | 1 hr. | 2 hrs. |
| 1 | 46.5 | 81.9 | 98.6 | 121 | 134 | 147 | 137 | 144 | 143 | 144 | 143 | 125 | 126 | 112 |
| 2 | 51.1 | 80.8 | 102 | 129 | 137 | 146 | 155 | 153 | 160 | 154 | 156 | 153 | 147 | 131 |
| 3 | 50.8 | 78.8 | 102 | 123 | 133 | 152 | 155 | 157 | 174 | 161 | 166 | 137 | 150 | 150 |
| 4 | 58.2 | 91.4 | 106 | 133 | 148 | 156 | 137 | 164 | 160 | 169 | 166 | 162 | 167 | 151 |
| 5 | 51.6 | 91.7 | 103 | 138 | 150 | 185 | 220 | 171 | 172 | 194 | 163 | 158 | 175 | 148 |
| 6 | 51.0 | 92.0 | 121 | 154 | 179 | 197 | 209 | 174 | 192 | 190 | 201 | 170 | 122 | 134 |
| 7 | 56.0 | 96.7 | 117 | 166 | 149 | 198 | 207 | 203 | 209 | 207 | 197 | 168 | 178 | 131 |
| 8 | 61.2 | 99.4 | 126 | 174 | 195 | 202 | 198 | 191 | 198 | 202 | 185 | 135 | 158 | 131 |

(1) FC-12 = dichlorodifluoromethane, i-PrOH = isopropyl alcohol
(2) mixture ratio by weight of the component blowing agents
(3) parts of blowing agent mixed in per hundred parts of polymer
(4) parts of azido functional silane mixed in per hundred parts of polymer
(5) specific volume of foam body aged for about a month divided by specific volume of the polymer determined prior to steam expansion tests
(6) expansion ratio of foam body determined in about two days after expansion in steam for given period of time

TABLE Ic

| TEST NO. | BLOWING AGENT TYPE (1) | RATIO (2) | LEVEL (3) | AZIDO SILANE LEVEL (4) | INITIAL EXPANSION RATIO (5) | 3 | 5 | 10 | 15 | 30 | 45 | 60 | 90 |
|---|---|---|---|---|---|---|---|---|---|---|---|---|---|
| | | | | | | EXPANSION RATIO AFTER EXPANDING IN HOT AIR AT 115° C. FOR (min) (6) | | | | | | | |
| 1 | FC-12/i-PrOH | 70/30 | 15.0 | — | 30.1 | 34.7 | 44.1 | 45.8 | 53.6 | 56.7 | 58.8 | 64.1 | 15.8 |
| 2 | FC-12/i-PrOH | 70/30 | 15.0 | 0.05 | 32.0 | 34.7 | 34.4 | 54.4 | 51.6 | 59.2 | 64.0 | 67.8 | 26.7 |
| 3 | FC-12/i-PrOH | 70/30 | 15.0 | 0.1 | 30.9 | 31.5 | 46.4 | 52.5 | 52.5 | 56.9 | 62.1 | 65.6 | 60.1 |
| 4 | FC-12/i-PrOH | 70/30 | 15.0 | 0.15 | 33.1 | 33.1 | 45.8 | 54.3 | 52.5 | 59.5 | 64.8 | 67.4 | 49.9 |
| 5 | FC-12/i-PrOH | 70/30 | 15.0 | 0.2 | 34.1 | 43.8 | 58.2 | 54.3 | 61.1 | 62.1 | 64.0 | 66.5 | 66.8 |
| 6 | FC-12/i-PrOH | 70/30 | 15.1 | 0.25 | 29.6 | 35.7 | 47.9 | 47.3 | 51.5 | 51.2 | 52.5 | 57.4 | 74.2 |
| 7 | FC-12/i-PrOH | 70/30 | 15.1 | 0.35 | 30.3 | 30.2 | 48.2 | 50.5 | 50.0 | 51.9 | 56.4 | 59.9 | 74.1 |
| 8 | FC-12/i-PrOH | 70/30 | 15.1 | 0.45 | 31.0 | 34.0 | 39.7 | 55.8 | 64.5 | 65.8 | 65.8 | 65.0 | 81.9 |
| | | | | | | EXPANSION RATIO AFTER EXPANDING IN HOT AIR AT 120° C. FOR (min) (7) | | | | | | | |
| 1 | FC-12/i-PrOH | 70/30 | 15.0 | — | 30.1 | 31.1 | 33.2 | 47.7 | 47.7 | 11.5 | 9.6 | 8.4 | 7.0 |
| 2 | FC-12/i-PrOH | 70/30 | 15.0 | 0.05 | 32.0 | 32.5 | 40.1 | 56.3 | 56.7 | 23.1 | 12.6 | 8.4 | 8.1 |
| 3 | FC-12/i-PrOH | 70/30 | 15.0 | 0.1 | 30.9 | 36.8 | 30.6 | 51.6 | 56.9 | 24.8 | 17.2 | 13.4 | 11.4 |
| 4 | FC-12/i-PrOH | 70/30 | 15.0 | 0.15 | 33.1 | 33.3 | 40.1 | 56.9 | 58.8 | 40.1 | 16.2 | 14.3 | 11.5 |
| 5 | FC-12/i-PrOH | 70/30 | 15.0 | 0.2 | 34.1 | 47.7 | 46.8 | 59.2 | 57.3 | 40.1 | 16.2 | 13.4 | 10.5 |
| 6 | FC-12/i-PrOH | 70/30 | 15.1 | 0.25 | 29.6 | 33.1 | 40.4 | 56.9 | 61.4 | 58.6 | 25.4 | 18.4 | 13.1 |
| 7 | FC-12/i-PrOH | 70/30 | 15.1 | 0.35 | 30.3 | 38.8 | 44.4 | 61.4 | 59.3 | 73.5 | 31.5 | 20.3 | 13.7 |

TABLE Ic-continued

| TEST NO. | BLOWING AGENT TYPE (1) | BLOWING AGENT RATIO (2) | AZIDO SILANE LEVEL (3) | INITIAL EXPANSION LEVEL (4) | RATIO (5) | 3 | 5 | 10 | 15 | 30 | 45 | 60 | 90 |
|---|---|---|---|---|---|---|---|---|---|---|---|---|---|
| 8 | FC-12/i-PrOH | 70/30 | 15.1 | 0.45 | 31.0 | 35.0 | 50.1 | 64.8 | 66.5 | 80.5 | 66.8 | 31.5 | 21.0 |

(1) FC-12 = dichlorodifluoromethane, i-PrOH = isopropyl alcohol
(2) mixture ratio by weight of the component blowing agents
(3) parts of blowing agent mixed in per hundred parts of polymer
(4) parts of azido functional silane mixed in per hundred parts of polymer
(5) specific volume of foam body aged for about a month divided by specific volume of the polymer determined prior to steam expansion tests
(6) expansion ratio of foam body after expanding in hot air of 115° C. for specified period
(7) expansion ratio of foam body after expanding in hot air of 120° C. for specified period While the methods and compositions herein described constitute preferred embodiments of the invention, it is to be understood that the invention is not limited to these precise methods and compositions, and that changes may be made in either without departing from the scope of the invention, which is defined in the appended claims.

What is claimed is:

1. A process for preparing lightly crosslinked olefin or styrene polymer foamed articles having a closed-cell structure, comprising the steps of:
   (a) providing an olefin or styrene polymer material,
   (b) admixing said olefinic or styrenic polymer material with (1) a blowing agent, (2) a crosslinking agent selected from the group consisting of silane, azido silane, titanate and amino compounds which upon reaction with said olefin or styrene polymer material reversibly releases alcohol, and (3) additionally admixing a sufficient amount of alcohol to control the degree of crosslinking of said olefin or styrene polymer material in the admixture which is thereby formed, and
   (c) extruding said admixture and activating said blowing agent in such a manner to expand said olefin or styrene polymer material to a cellular structure and at the same time dissipate said alcohol, whereby foaming and crosslinking of said olefin or styrene polymer material concurrently takes place.

2. The process of claim 1 wherein said crosslinking agent is an organofunctional alkoxy silane selected from the group consisting of gamma-glycidoxypropyltrimethoxy silane, gamma-methacryloxypropyltrimethoxy silane, vinyltrimethoxy silane, vinyltriethoxy silane, N-(2-aminoethyl)-3-aminopropyltrimethoxy silane, N-β-(N-vinyl benzyl amino) ethylaminopropyltrimethoxy silane, methyltrimethoxy silane, and gamma-aminopropyl trimethoxy silane.

3. The process of claim 1 wherein said crosslinking agent is an azido silane of the formula R R'SiY$_2$ in which R represents an azido functional radical attached to silicon through a silicon to carbon bond and composed of carbon, hydrogen, sulfur, nitrogen, or oxygen, each Y represents a hydrolyzable organic radical, and R' represents a monovalent hydrocarbon radical or a hydrolyzable organic radical.

4. The process of claim 3 wherein said crosslinking agent is selected from the group consisting of 2-(trimethoxysilyl)ethyl phenyl sulfonyl azide and (triethoxy silyl) hexyl sulfonyl azide.

5. The process of claim 1 wherein said crosslinking agent is a titanate having a general formula Ti(OR)$_4$ where R is C$_1$ to C$_{18}$ alkyl or having a formula (RO)-$m$—Ti(O-X-R$^2$-Y)$_n$ wherein R is alkyl, X is carboxyl, R$^2$ is alkyl, Y is a reactive double bond or amino, and m and n are integers which total 4.

6. Tne process of claim 5 wherein said crosslinking agent is selected from the group consisting of titanium isopropoxide, and tetramethyl, titanate.

7. The process of claim 1 wherein said crosslinking agent is selected from the group consisting of hexamethoxymethylmelamine and alkylated glycoluril-formaldehyde resins.

8. The process of claim 1 wherein said olefin or styrene polymer material is selected from the group consisting of linear low density polyethylene, high density polyethylene, polypropylene, polystyrene, styrene/acrylic acid copolymers, ethylene/acrylic acid copolymers, styrene/acrylonitrile/hydroxy ethylacrylate terpolymers, and mixtures thereof.

9. The process of claim 8 wherein said alcohol is an aliphatic alcohol selected from the group consisting of methanol, ethanol, n-propanol, i-propanol, and butanol.

10. The process of claim 9 wherein said blowing agent is selected from the group consisting of dichlorodifluoromethane, trichloromonofluoromethane, dichlorotetrafluoroethane and mixtures thereof.

11. The process of claim 1 wherein said olefin styrene polymer material is selected from the group consisting of styrene/acrylic acid copolymer and ethylene/acrylic acid copolymers and said crosslinking agent is hexamethoxymethylmelamine.

12. The process of claim 1 wherein said olefin or styrene polymer material is selected from the group consisting of linear low density polyethylene, high density polyethylene, polystyrene and mixtures thereof and said crosslinking agent is 2-(trimethoxysilyl) ethyl phenyl sulfonyl azide.

13. The process of claim 1 wherein said olefin or styrene polymer is a styrene/acrylonitrile/hydroxy ethylacrylate terpolymer and said crosslinking agent is selected from the group consisting of titanium isopropoxide, and tetramethyl titanate.

* * * * *

UNITED STATES PATENT AND TRADEMARK OFFICE
CERTIFICATE OF CORRECTION

PATENT NO. : 4,694,025
DATED : Sep. 15, 1987
INVENTOR(S) : Chung P. Park

It is certified that error appears in the above-identified patent and that said Letters Patent is hereby corrected as shown below:

Column 2, line 22, "Slogburg" should read --Beckman et al.--.
Column 5, line 62 of the formula, "I" should read --$\underline{I}$--; and on line 66, "I" should read --$\underline{I}$--.
Column 6, line 10, "tne" should read --the--.
Column 9, line 45, "corsslinking" should read --crosslinking--.
Column 12, line 66, "contined" should read --contained--.
Column 16, in TABLE F, last line on page under column heading CELL SIZE (mm) (10), "0.50" should read --0.52--.
Column 17, in TABLE F-continued under same column referenced in preceding item, line 1, "0.98" should read --0.95--; and in line 4, same column, "0.59" should read read --.052--.
Column 20, TABLE H, column heading DIE PRESS (psig), "929" should read --(5)--; and on lines 4 and 5 of TEST No. 1, delete "ND" and "20.7"; under column heading OPEN CELL, line 1, "92.9" should read --92.5--.
Column 21, TABLE H-continued under column heading OPEN CELL, line 6, "10.1" should read --10.3-- and line 7 "8.1" should read --8.3--.
Column 24, right half of page under TABLE Ic heading "EXPANSION RATIO AFTER EXPANDING IN HOT AIR AT 115°C.FOR (min)(6)" should be repositioned above under first black line under TABLE Ic.
Column 26, line 44, "olefin styrene" should read --olefin or styrene--.

Signed and Sealed this

Third Day of January, 1989

*Attest:*

DONALD J. QUIGG

*Attesting Officer*     *Commissioner of Patents and Trademarks*